United States Patent
Williams et al.

(10) Patent No.: US 6,550,703 B2
(45) Date of Patent: Apr. 22, 2003

(54) BLENDER CUTTER

(75) Inventors: Brian Williams, Midlothian, VA (US); Brian Sullivan, Richmond, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 0 days.

(21) Appl. No.: 09/819,629

(22) Filed: Mar. 29, 2001

(65) Prior Publication Data

US 2002/0139884 A1 Oct. 3, 2002

(51) Int. Cl.$^7$ ................................................ A47J 43/06
(52) U.S. Cl. .............. 241/100; 241/199.12; 241/282.2; 241/292.1
(58) Field of Search ............................. 241/100, 282.1, 241/292.1, 199.12, 282.2

(56) References Cited

U.S. PATENT DOCUMENTS

| | | | |
|---|---|---|---|
| 2,223,018 A | | 11/1940 | Christensen |
| 2,576,802 A | | 11/1951 | Morris |
| 2,678,809 A | | 5/1954 | Seilberger |
| 2,771,111 A | * | 11/1956 | Seyfried ................... 241/282.1 |
| 2,788,038 A | | 4/1957 | Corcoran |
| 2,940,738 A | * | 6/1960 | Posener et al. .......... 241/282.1 |
| 2,945,634 A | | 7/1960 | Beck |
| 3,024,010 A | * | 3/1962 | Sperling ................... 241/282.1 |
| 3,216,473 A | | 11/1965 | Dewenter |
| 3,240,246 A | | 3/1966 | Dewenter |
| 3,380,499 A | | 4/1968 | Vocci |
| 3,559,897 A | * | 2/1971 | Carr ........................ 241/101.1 |
| 3,856,220 A | | 12/1974 | Waters |
| 4,087,053 A | | 5/1978 | Voglesonger |
| 4,640,467 A | * | 2/1987 | Takeuchi ................. 241/152.1 |
| 5,487,511 A | | 1/1996 | Sansone |
| 5,647,546 A | | 7/1997 | Sinovas |
| 5,655,834 A | | 8/1997 | Dickson |
| 5,823,672 A | | 10/1998 | Barker |
| 6,092,922 A | | 7/2000 | Kett |

FOREIGN PATENT DOCUMENTS

| | | |
|---|---|---|
| DE | 265807 | 3/1950 |
| DE | 942163 | 4/1956 |
| FR | 1386353 B01 | 12/1965 |

OTHER PUBLICATIONS

Photos (4) of a Waring Blender Blade (date unknown).

* cited by examiner

*Primary Examiner*—John M. Husar
(74) *Attorney, Agent, or Firm*—John H. Thomas, P.C.

(57) ABSTRACT

A cutter for use in a blender includes a central hub portion defining a horizontal plane. First and second pairs of blades extend outwardly from the hub portion. The first pair of blades is oriented on opposite sides of the hub portion and the blades lie in substantially the same horizontal plane as the hub portion. The second pair of blades is oriented on opposite sides of the hub portion and the blades extend upwardly from the horizontal plane of the hub portion, and further wherein the angles of upward extension of each of the second pair of blades is asymmetric. Further, each blade of the first set of blades has a cutting edge and trailing edge, and each blade of the first set of blades is pitched so that there is a downward slope from the cutting edge to the trailing edge.

18 Claims, 3 Drawing Sheets

BLENDER CUTTER

This invention relates to a cutter for a blender. Specifically, this invention relates to the angles and pitches of the blades of a cutter.

BACKGROUND OF THE INVENTION

There are many different types of blenders that have been available for many years. Each blender is adapted to cut, chop, mix, blend, liquify, etc. Many types of cutters have been used in connection with these blenders to accomplish these food processing purposes.

Known cutters include a wide range of symmetric and asymmetric blade configurations. The blades are angled in some cases. Further, known cutters are often made of multiple separate blade components that are joined together to make up the complete cutter.

One problem with many blenders is that their cutters process material at the bottom of the blender jar only. There is inefficient circulation of the material that is being processed. Also, even in blenders where the processed material circulation is better, the size of the particles of processed material can be inconsistent. Particularly when crushing ice, for instance, it is desirable to have an even consistency of the ice material through the entire blender after processing.

SUMMARY OF THE INVENTION

Accordingly it is an object of the present invention to overcome the foregoing drawbacks and provide a cutter that renders an efficient machine for producing a consistent material product as a result of the blender processing.

In one embodiment, the cutter for use in a blender includes a central hub portion that defines a horizontal plane. First and second pairs of blades extend outwardly from this hub portion. The first pair of blades is oriented on opposite sides of the hub portion and the blades lie in substantially the same horizontal plane as the hub portion. The second pair of blades is oriented on opposite sides of the hub portion and the blades each extend upwardly from the horizontal plane of the hub portion wherein the angles of upward extension of the second pair of blades are asymmetric. Further, each blade of the first set of blades has a cutting edge and a trailing edge, and each blade of the first set of blades is pitched so that there is a downward slope from the cutting edge to the trailing edge. The angle of downward slope may be from five degrees to fifteen degrees. In one preferred embodiment, the angle of slope is ten degrees. The angle of upward extension of one blade of the second pair of blades may be forty-one degrees plus or minus ten degrees, and the angle of upward extension of the other blade of the second pair of blades may be fifty one degrees plus or minus ten degrees. Still further, each blade of the second set of blades may have a cutting edge and trailing edge wherein each blade of the second set of blades is pitched so that there is a downward slope from the cutting edge to the trailing edge. The angle of downward slope of the second set of blades may be from five to fifteen degrees, and preferably ten degrees.

In an alternative embodiment, the cutter for use in a blender includes a central hub portion defining a horizontal plane. First and second pairs of blades extend outwardly from the hub portion. The first pair of blades is oriented on opposite sides of the hub portion and the blades lie in substantially the same horizontal plane as the hub portion. The second pair of blades is oriented on opposite sides of the hub portion and the blades each extend upwardly from the horizontal plane of the hub portion, further wherein the angles of upward extension of the second pair of blades are asymmetric. Still further, each blade of the second set of blades has a cutting edge and trailing edge, and each blade of the second set of blades is pitched so that there is a downward slope from the cutting edge to the trailing edge. The angle of downward slope may be from five to fifteen degrees, preferably ten degrees. The angle of upward extension of one blade of the second pair of blades may be forty one degrees plus or minus ten degrees, and the angle of upward extension of the other blade of the second pair of blades may be fifty one degrees plus or minus ten degrees.

In a still further embodiment, the invention includes a blender comprising a blender jar for receiving material to be processed, a rotatable cutter positioned within the blender jar, and a motor carried in a housing with a drive shaft for rotatably driving the cutter. The cutter is as described above in its several variations.

DETAILED DESCRIPTION OF THE PREFERRED EMBODIMENTS

The present invention includes a cutter having blades that are asymmetrically angled and pitched in order to best circulate the material to be processed in a blender and to evenly process that material.

Figure 1:
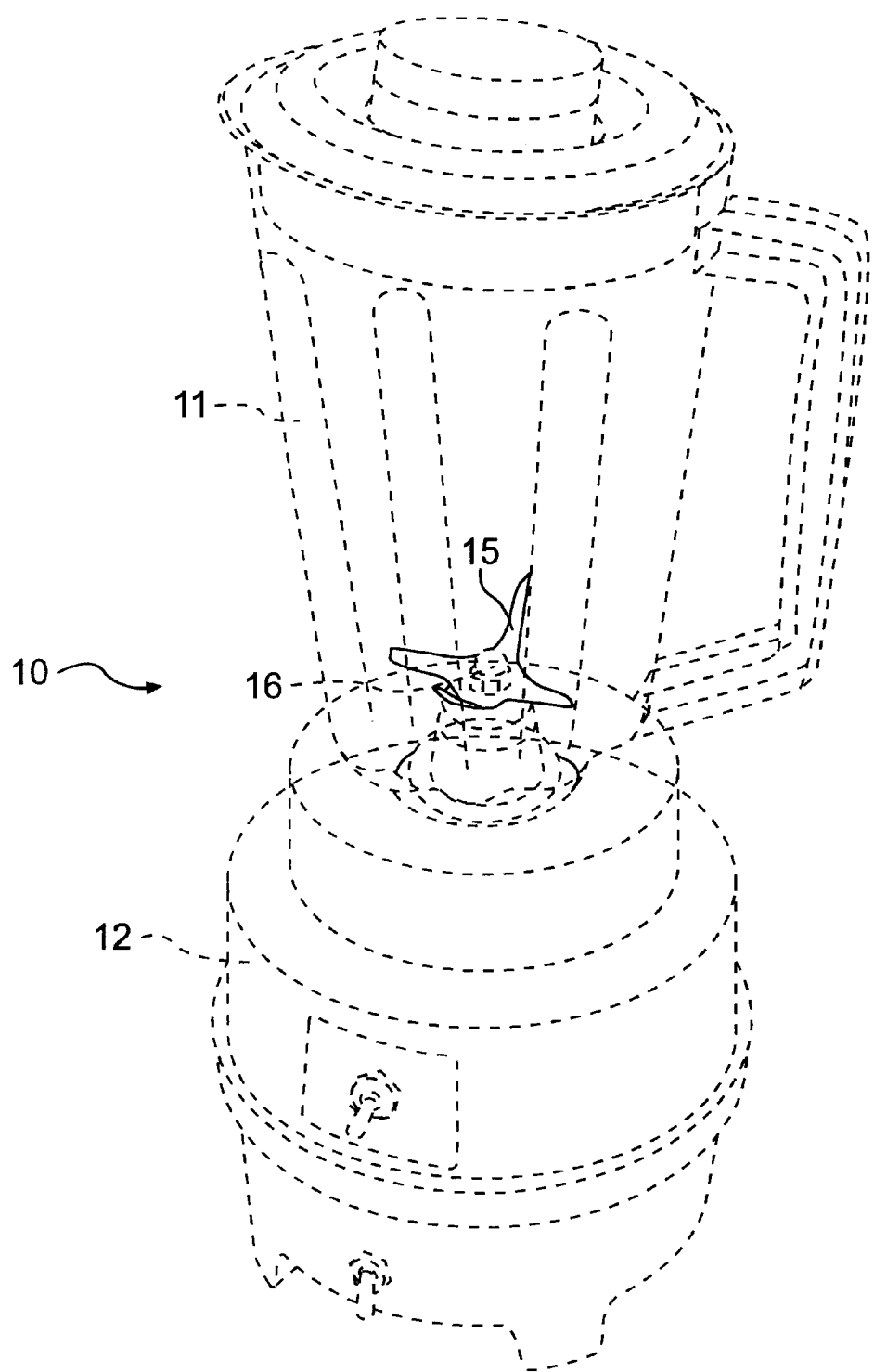
FIG. 1 is a perspective view of a blender (shown in dotted lines) with the cutter in accordance with the present invention shown within it.

Turning first to FIG. 1, there is shown a blender 10 made up of a blender jar 11 mounted onto a housing 12 in which is positioned a motor (not shown). The motor turns a drive shaft onto which is connected the cutter 15 by the nut 16. Details with respect to the motor, drive shaft, clutch and bearing assemblies are not shown. They are conventionally assembled in order to drive the cutter 15 in a rotatable fashion to process material that is received in the blender jar 11.

Figure 2:
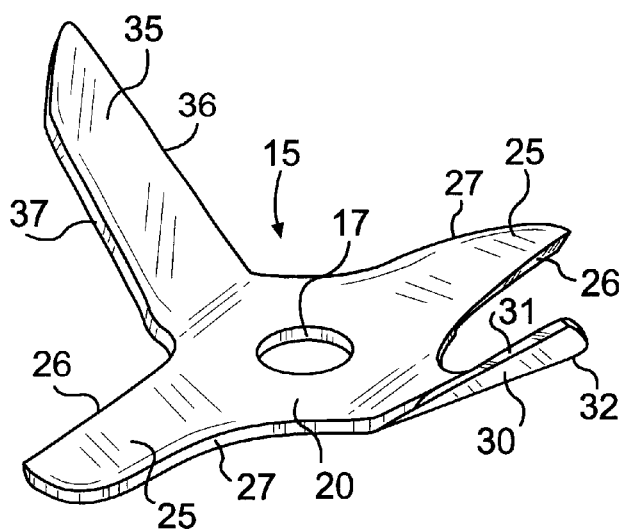
FIG. 2 is a perspective view of a preferred embodiment of the cutter.
Figure 4:
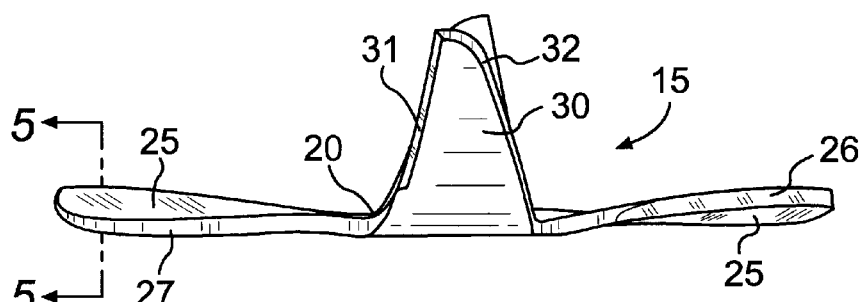
FIG. 4 is another side elevation view of the cutter shown in FIG. 2.

Turning now to FIG. 2, there is shown the cutter 15 that was also seen in FIG. 1. The cutter 15 has a hub portion 20 which defines a circular aperture 17 which allows the drive shaft (not shown) to be connected to the cutter. The hub portion 20 defines a horizontal plane. Extending outwardly from the hub portion 20 are four blades 25, 25, 30, and 35. The blades 25 are mounted on opposite sides of the hub portion 20. Blades 25 are mounted substantially in the same horizontal plane as the hub portion as also shown in FIG. 4. Each of this pair of blades 25 has a cutting edge 26 and trailing edge 27. The cutting edge 26 is machined to have a relatively sharp front edge so that it engages and cuts the material when the cutter 15 is rotated within the blender jar 11. The trailing edge 27 is more arcuate than the cutting edge 26. The arcuate trailing edge 27 makes the base of the blade 25 adjacent the hub portion 20 wider than the outside end of the blade. The other pair of blades 30 and 35 shown in FIG. 2 extend upwardly from the horizontal plane of the hub portion 20. Like the other blades 25, blades 30 and 35 have a similar cutting edge 31 and 36 and trailing edge 32 and 37.

Figure 3:
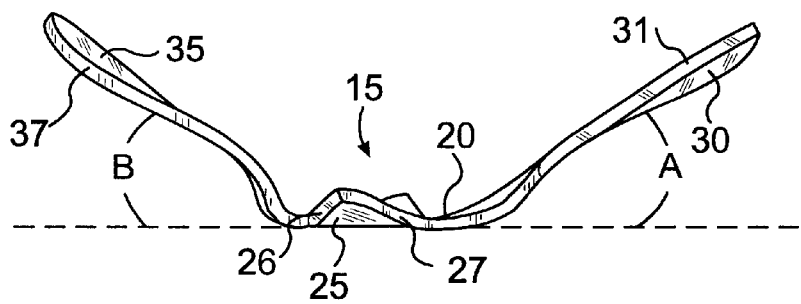
FIG. 3 is a side elevation view of the cutter shown in FIG. 2.

FIG. 3 shows a side elevation view of the cutter 15 looking down the blades 25. In this view, blades 30 and 35 are shown as being angled upwardly from the horizontal plane of the hub portion 20. As seen in FIG. 3, the angle A shows the upward angle of blade 30, while angle B shows the upward angle of blade 35. In the present invention, the angles A and B are not the same. That is, the angles A and B are asymmetric. Preferably, the angle of upward extension of one of the blades 30 or 35 is forty one degrees plus or minus ten degrees. The angle of upward extension of the other of the blades 30 or 35 is fifty one degrees plus or minus ten degrees. In FIG. 3, angle A is 41° and angle B is 51°.

Turning now to FIG. 4, there is shown a side elevation view of the cutter 15 looking down the blade 30, with blade 35 mostly hidden behind it. The pair of blades 25 are shown as being disposed substantially in the same horizontal plane as the hub portion 20.

Figure 5:
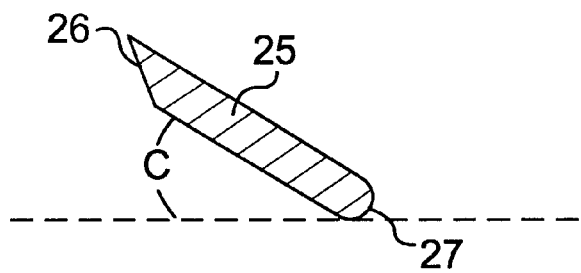
FIG. 5 is a cross sectional view of a blade of the cutter taken along lines 5—5 in FIG. 4.
Figure 6:
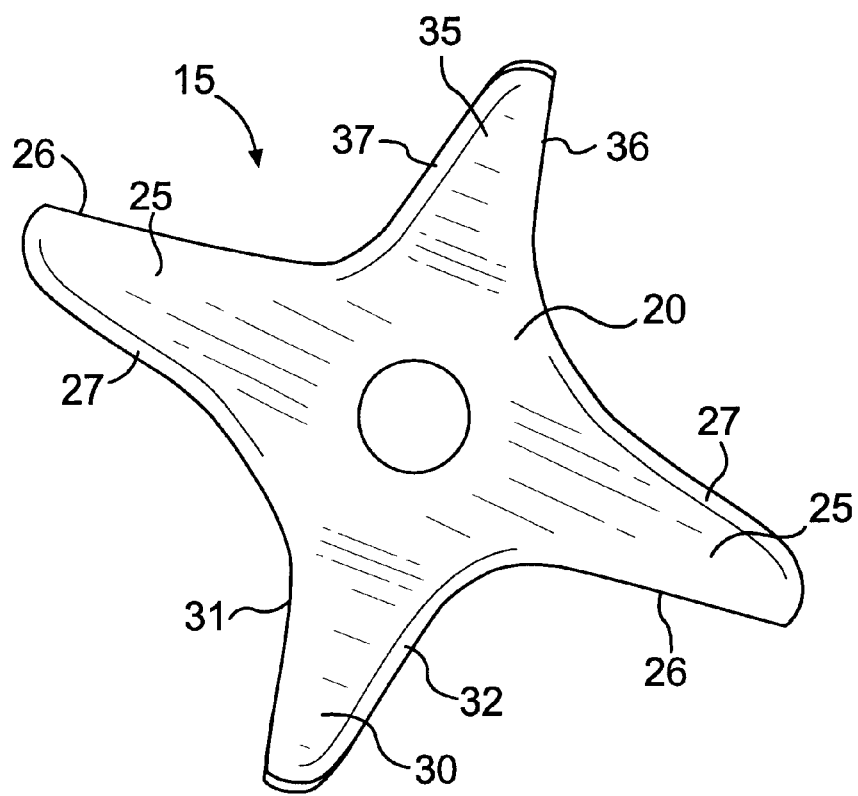
FIG. 6 is a top elevation view of the cutter shown in FIG. 2.

FIG. 5 shows a side elevation, cross sectional view of blade 25. This view of blade 25 is meant to specifically highlight the pitch or angle C which is the slope of the blade from the cutting edge 26 downwardly to the trailing edge 27. This angle of downward slope C is preferably in the range of five to fifteen degrees—in this figure, ten degrees. Blade 25 is representative of the pitch of each of the blades 25, 30 and 35. Each of the blades 25, 30 and 35 may have the same pitch, or they may have different pitches depending on the application and purpose of the blender. This pitch is obtained by twisting the blades 25, 30 and 35 so that a substantial portion of the face of those blades has the desired pitch. The pitch of the blades acts to pull the material within a blender down to the cutter 15 and where it is processed and circulated. The specific ten degree pitch has, in combination with the upward angles of forty one degrees and fifty one degrees for blades 30 and 35, been found to be very efficient and effective in processing iced drinks. Good circulation and even processing results from these specific pitches and angles of upward inclination. There may be other variations of pitch and upward inclination that are found to be effective for other specified materials to be processed.

In the actual blender illustrated in the figures, the blender jar 11 holds approximately two liquid quarts. The entire cutter 15 has a width of approximately 2.5 inches measured along the blades 25.

As shown, the cutter 15 is a single piece. The cutter may be multiple pieces, including two pairs of blades, with each pair of blades being a separate part but attached together around a drive shaft.

Also, the cutter 15 is preferably formed from stainless steel. Stainless steel is a very durable material and can withstand the high rpms required in conventional blenders. Other types of metals and composites may be used in accordance with the present invention.

During fabrication, the blade is simply punched out of stainless steel and then twisted and bent in order to meet the desired angles of inclination and the desired pitches. Other methods of fabrication including casting and machining can obtain the same functional results.

While the invention has been described with reference to specific embodiments thereof, it will be understood that numerous variations, modifications and additional embodiments are possible, and accordingly, all such variations, modifications, and embodiments are to be regarded as being within the spirit and scope of the invention.

What is claimed is:

1. A cutter for use in a blender comprising:

a central hub portion defining a horizontal plane;

first and second pairs of blades extending outwardly from the hub portion;

wherein the first pair of blades is oriented on opposite sides of the hub portion and the blades lie in substantially the same horizontal plane as the hub portion, wherein the second pair of blades is oriented on opposite sides of the hub portion and the blades extend upwardly from the horizontal plane of the hub portion, further wherein the angles of upward extension of each of the second pair of blades is asymmetric, and further wherein each blade of the first set of blades has a cutting edge and trailing edge and each blade of the first set of blades is pitched so that there is a downward slope from the cutting edge to the trailing edge.

2. A cutter as described in claim 1, wherein the angle of slope is from 5° to 15°.

3. A cutter as described in claim 1, wherein the angle of slope is 10°.

4. A cutter as described in claim 1, wherein the angle of upward extension of one blade of the second pair of blades is 41°±10°, and the angle of upward extension of the other blade of the second pair of blades is 51°±10°.

5. A cutter as described in claim 1, wherein each blade of the second set of blades has a cutting edge and trailing edge and each blade of the second set of blades is pitched so that there is a downward slope from the cutting edge to the trailing edge.

6. A cutter as described in claim 5, wherein the angle of slope of the second set of blades is from 5° to 15°.

7. A cutter as described in claim 5, wherein the angle of slope of the second set of blades is 10°.

8. A cutter as described in claim 5, wherein the angle of upward extension of one blade of the second pair of blades is 41°±10°, and the angle of upward extension of the other blade of the second pair of blades is 51°±10°.

9. A cutter for use in a blender comprising:

a central hub portion defining a horizontal plane;

first and second pairs of blades extending outwardly from the hub portion;

wherein the first pair of blades is oriented on opposite sides of the hub portion and the blades lie in substantially the same horizontal plane as the hub portion, wherein the second pair of blades is oriented on opposite sides of the hub portion and the blades extend upwardly from the horizontal plane of the hub portion, further wherein the angles of upward extension of each of the second pair of blades is asymmetric, and still further wherein each blade of the second set of blades has a cutting edge and trailing edge and each blade of the second set of blades is pitched so that there is a downward slope from the cutting edge to the trailing edge.

10. A cutter as described in claim 9, wherein the angle of slope is from 5° to 15°.

11. A cutter as described in claim 9, wherein the angle of slope is 10°.

12. A cutter as described in claim 9, wherein the angle of upward extension of one blade of the second pair of blades is 41°±10°, and the angle of upward extension of the other blade of the second pair of blades is 51°±10°.

13. A cutter as described in claim 9, wherein each blade of the first set of blades has a cutting edge and trailing edge and each blade of the first set of blades is pitched so that there is a downward slope from the cutting edge to the trailing edge.

14. A cutter as described in claim 13, wherein the angle of slope of the second set of blades is from 5° to 15°.

15. A cutter as described in claim 13, wherein the angle of slope of the second set of blades is 10°.

16. A cutter as described in claim 13, wherein the angle of upward extension of one blade of the second pair of blades is 41°±10°, and the angle of upward extension of the other blade of the second pair of blades is 51°±10°.

17. A blender comprising:

a blender jar for receiving material to be processed, a rotatable cutter positioned within the blender jar, a motor carried in a housing with a drive shaft for rotatably driving the cutter, the cutter comprising:

a central hub portion defining a horizontal plane;

first and second pairs of blades extending outwardly from the hub portion;

wherein the first pair of blades is oriented on opposite sides of the hub portion and the blades lie in substantially the same horizontal plane as the hub portion, wherein the second pair of blades is oriented on opposite sides of the hub portion and the blades extend upwardly from the horizontal plane of the hub portion, further wherein the angles of upward extension of each of the second pair of blades is asymmetric, and further wherein each blade of the first set of blades has a cutting edge and trailing edge and each blade of the first set of blades is pitched so that there is a downward slope from the cutting edge to the trailing edge.

18. A blender comprising:

a blender jar for receiving material to be processed, a rotatable cutter positioned within the blender jar, a motor carried in a housing with a drive shaft for rotatably driving the cutter, the cutter comprising:

a central hub portion defining a horizontal plane;

first and second pairs of blades extending outwardly from the hub portion;

wherein the first pair of blades is oriented on opposite sides of the hub portion and the blades lie in substantially the same horizontal plane as the hub portion, wherein the second pair of blades are oriented on opposite sides of the hub portion and the blades extend upwardly from the horizontal plane of the hub portion, further wherein the angles of upward extension of each of the second pair of blades is asymmetric, and still further wherein each blade of the second set of blades has a cutting edge and trailing edge and each blade of the second set of blades is pitched so that there is a downward slope from the cutting edge to the trailing edge.

* * * * *